United States Patent [19]
Ando

[11] Patent Number: 4,779,934
[45] Date of Patent: Oct. 25, 1988

[54] VEHICLE ANTISKID CONTROL APPARATUS WITH FLOW RATE CONTROL VALVE IN DISCHARGE PASSAGE

[75] Inventor: Hiromi Ando, Tokyo, Japan

[73] Assignee: Tokico Ltd., Kanagawa, Japan

[21] Appl. No.: 59,122

[22] Filed: Jun. 3, 1987

[30] Foreign Application Priority Data

Jun. 6, 1986 [JP] Japan ................ 61-131146

[51] Int. Cl.$^4$ ............................. B60T 8/087
[52] U.S. Cl. ............................. 303/115; 188/181 A; 303/68; 303/116; 303/117; 303/110
[58] Field of Search ............... 303/113–119, 303/68–69, 61–63, 10–12, 93, 110; 188/181

[56] References Cited

U.S. PATENT DOCUMENTS

| | | | |
|---|---|---|---|
| 4,353,440 | 10/1982 | Farr | 303/116 X |
| 4,377,221 | 3/1983 | Farr | 188/181 A |
| 4,401,348 | 8/1983 | Farr | 303/116 |
| 4,474,413 | 10/1984 | Farr | 303/116 |
| 4,553,651 | 11/1985 | Gaiser et al. | 303/97 |
| 4,610,483 | 9/1986 | Matsumoto et al. | 192/13 A |
| 4,725,102 | 2/1988 | Ando et al. | 188/181 A X |
| 4,736,823 | 4/1988 | Ando et al. | 303/115 X |

FOREIGN PATENT DOCUMENTS

55-36187 3/1980 Japan .

*Primary Examiner*—Douglas C. Butler
*Attorney, Agent, or Firm*—Wenderoth, Lind & Ponack

[57] ABSTRACT

An antiskid apparatus provided in a communicating passage extending between a master cylinder and a brake cylinder in a brake system for a vehicle includes a flow rate control valve provided in a discharge passage which connects a pressure regulating chamber and a damping valve. The flow rate control valve includes a valve body having a flow path which defines a part of the discharge passage, and a valve member disposed in such a manner as to be reciprocal along the flow path. The valve member is normally separated from a valve seat formed on the valve body by the action of a spring in order to open the flow path. When subjected to pressure supplied from the pressure regulating chamber, the valve member is brought into contact with the valve seat to close the flow path. The valve member is provided with an orifice which provides communication between the flow path and a portion of the discharge passage on the side thereof which is closer to the pressure regulating chamber. Thus, the response of the flow rate control valve is improved, and it is possible to facilitate the production thereof and lower the production cost of the apparatus.

5 Claims, 5 Drawing Sheets

VEHICLE ANTISKID CONTROL APPARATUS WITH FLOW RATE CONTROL VALVE IN DISCHARGE PASSAGE

BACKGROUND OF THE INVENTION

1. Field of the Invention

The present invention relates to an antiskid apparatus for use in a brake for a vehicle. More particularly, the present invention pertains to an antiskid apparatus which is so designed that, when a wheel approaches a locked state, the pressure of a braking liquid is reduced in accordance with the level of the pressure within the brake cylinder.

2. Description of the Related Art

In general, an antiskid apparatus is provided at an intermediate portion of a path for transmitting the pressure of a braking liquid in a master cylinder that is actuated by the operation of brake pedal to the wheel cylinders provided for each wheel. In the case of braking such as to bring the vehicle to a sudden stop, the antiskid apparatus controls the pressure of the braking liquid in such a manner that, as the wheel approaches a locked state, the liquid pressure is alternately raised and lowered in order to prevent side slip of the wheel and to thereby ensure the required steering stability and, at the same time, reduce the distance needed for the vehicle to come to a stop after the application of the brakes.

FIGS. 1 to 3 show in combination one example of conventional antiskid apparatuses of the type described above. The illustrated conventional antiskid apparatus comprises a lock detecting section A for detecting the locked state of a wheel, a liquid pressure regulating section B arranged to lower the pressure of a braking liquid in accordance with the result of the detection effected by the lock detecting section A, and a pressure raising section C for re-raising the lowered pressure of the braking liquid.

When the vehicle is in a normal running state, a ball valve member 2 within a valve chest 1 in the liquid pressure regulating section B is pushed up by means of a pin 3a which is rigidly secured to a piston 3 and which is received through an opening 1a, thereby maintaining the opening 1a in an open state and thus providing communication between a port 4 that communicates with a master cylinder and a port 5 that communicates with a wheel cylinder. When, in this state, the braking liquid is supplied to the port 4 from the master cylinder in response to the operation of the brake pedal, the braking liquid is delivered to the port 5 through an inlet chamber 6 in the pressure raising section C, a communicating passage 7 and the valve chest 1 and is then supplied to the wheel cylinder.

In the lock detecting section A, a flywheel 10 is supported by a rotary shaft 8 which is rotated together with an axle as one unit in such a manner that the flywheel 10 is operatively connected to the rotary shaft 8 through a ball-and-ramp mechanism 9.

At the time of braking such as to bring the vehicle to a sudden stop, as the wheel approaches a locked state, a difference in rotation is produced between the flywheel 10 and the rotary shaft 8, and the flywheel 10 is thus moved leftward as viewed in FIG. 3 to press a lever 11 so that the lever 11 is pivoted clockwise about a pivot member 11a, thereby actuating a damping valve 12. The damping valve 12 is provided halfway along a discharge passage 15 which extends from a cylinder chamber 13 in the liquid pressure regulating section B to a return port 14 that communicates with a reservoir of the master cylinder. The damping valve 12 normally blocks the flow path but it is opened by the action of the lever 11 in order to allow the braking liquid contained in the cylinder chamber 13 to flow to the reservoir. When the pressure of the braking liquid within the cylinder chamber 13 lowers as the result of a reduction in the amount of braking liquid, the piston 3 descends, and the ball valve member 2 which has been pushed up by the piston 3 now closes the opening 1a, thereby cutting off the transmission of the braking liquid pressure to the wheel cylinder. The liquid is further discharged from the cylinder chamber 13, and the piston 3 is thus lowered. In consequence, the pressure of the liquid within the wheel cylinder is lowered and the wheel is accordingly unlocked. A pump chamber 17 in the pressure raising section C communicates with the cylinder chamber 13 through a communicating passage 16, and the pressure within the pump chamber 17 is also lowered in response to a lowering in pressure within the cylinder chamber 13, thus causing a piston 18 within the pump chamber 17 to descend so as to come into contact with an eccentric cam 19 which is formed integrally with the rotary shaft 8. As a result, the piston 18 is reciprocated by the action of the cam 19 to cause a pumping action whereby the braking liquid in the reservoir is supplied to the cylinder chamber 13 in the liquid pressure regulating section B via the pump chamber 17. Since, at this time, the damping valve 12 is opened, there is no rise in pressure within the cylinder chamber 13.

On the other hand, when the difference in rotation between the rotary shaft 8 and the flywheel 10 decreases as the result of the fact that the flywheel 10 is decelerated by means of a friction plate 20 and that the rotation of the wheel recovers from the decelerated state after being unlocked, the rotary shaft 8 and the flywheel 10 are coupled together so as to return to the interlocked state by means of the ball-and-ramp mechanism 9. In consequence, the damping valve 12 is closed, and the pressure of the braking liquid within the cylinder chamber 13 is raised by the operation of the pressure raising section C, so that the ball valve member 2 is pushed up by the piston 3, thus allowing resumption of the supply of braking liquid to the wheel cylinder.

In this antiskid apparatus, a flow rate control valve 21 is provided between the cylinder chamber 13 in the liquid pressure regulating section B and the damping valve 12 so that the flow rate of the braking liquid which is returned to the reservoir through the discharge passage 15 is controlled in accordance with the pressure within the cylinder chamber 13 in the liquid pressure regulating section B.

As shown in FIG. 1 in an enlarged view, the flow rate control valve 21 has a valve body 22 which is such that the valve body 22 defines an inlet of the discharge passage 15 below the cylinder chamber 13 in the liquid pressure regulating section B. A retainer 23 having a plurality of bores 23a is provided in an opening formed at the upper end of the valve body 22. A piston 25 and a ball valve member 27 are vertically movably accommodated in the valve body 22, the piston 25 being biased toward the cylinder chamber 13 by the action of a spring 24, and the ball valve member 27 being disposed between the distal end of the piston 25 and the retainer 23 and biased counter to the piston 25 by the action of a spring 26. An orifice 28 is provided in the upper side wall of the valve body 22, while a communicating bore 29 having a relatively large diameter is provided in the lower side wall of the valve body 22, and a seat portion 30 which cooperates with the ball valve member 27 is formed at an intermediate position between the orifice 28 and the communicating bore 29. More specifically, the outer diameter of the ball valve member 27 is so set that a slight clearance is provided betwen the ball valve member 27 and the orifice 28 in order to maintain the orifice 28 in an open state at all times. However, the ball valve member 27 closes the communicating bore 29 when it is pressed against the seat portion 30 as shown by the chain line in FIG. 1.

When the wheel approaches a locked state while the vehicle is running on a road surface which exhibits a relatively high coefficient of friction, the pressure of braking liquid within the cylinder chamber 13 is increased, so that the ball valve member 27 is lowered by the liquid pressure to close the seat portion 30, thus allowing the braking liquid to be discharged relatively slowly through the orifice 28 alone. On the other hand, when the wheel approaches a locked state while the vehicle is running on a road surface that exhibits a relatively low coefficient of friction, such as an icy surface, the pressure of braking liquid within the cylinder chamber 13 is relatively low, so that the ball valve member 27 is pushed up by the piston 25, thus allowing the braking liquid within the cylinder chamber 13 to be discharged rapidly through both the orifice 28 and the communicating bore 29.

However, the flow rate control valve 21 of the type described above suffers from the following problems. Since the ball valve member 27 and the piston 25 are discrete members and these members are moved in contact with each other, there is some risk of the force acting on the ball valve member 27 failing to act directly on the piston 25, which involves a further risk of the response of the ball valve member 27 deteriorating. Further, since the piston 25, the ball valve member 27 and the two springs 24, 26 for biasing them are accommodated in the valve body 22 in a complicated combined state, production of the flow rate control valve 21 involves a difficult and costly manufacturing process. In addition, the arrangement shown in FIG. 1 requires that the orifice 28 is provided in an inclined state, and this involves difficulties in machining.

SUMMARY OF THE INVENTION

In view of the above-described circumstances, it is a primary object of the present invention to provide an antiskid apparatus in which the response of the flow rate control valve is enhanced to improve the control function and the production of the flow rate control valve is facilitated to lower the production cost of the antiskid apparatus.

To this end, the present invention provides an antiskid apparatus having a flow rate control valve which is arranged as follows.

The flow rate control valve comprises: a valve body; a valve member received in the valve body in such a manner as to be reciprocal along a flow path in order to close a seat portion of the valve body by means of the pressure of a liquid supplied from the cylinder chamber in the liquid pressure regulating section; a spring biasing the valve member counter to the liquid pressure in order to open the seat portion when the liquid pressure is relatively low; and a retainer for preventing the valve member biased by means of the spring from coming off the valve body. In addition, the above-described piston is provided with an orifice which provides communication between the inside of the cylinder chamber and the discharge passage.

Thus, in the antiskid apparatus according to the present invention, when the wheel approaches a locked state while the vehicle is running on a road surface that displays a relatively high coefficient of friction, the braking liquid within the cylinder chamber in the liquid pressure regulating section is discharged through the orifice in the valve member alone since a relatively high liquid pressure supplied from the cylinder chamber causes the valve member of the flow rate control valve to close the seat portion. On the other hand, when the wheel approaches a locked state while the vehicle is running on a road surface that exhibits a relatively low coefficient of friction, the liquid pressure from the cylinder chamber is relatively low, so that the valve member of the flow rate control valve is caused by the biasing force from the spring to open the seat portion, thus allowing the braking liquid to be discharged at a relatively high flow rate through both the orifice and the opening defined at the seat portion.

The above and other objects, features and advantages of the present invention will become more apparent from the following description of the preferred embodiment thereof, taken in conjunction with the accompanying drawings.

BRIEF DESCRIPTION OF THE DRAWINGS

FIGS. 1, 2, and 3 show in combination one example of conventional antiskid apparatuses, in which:

FIG. 1 is a longitudinal sectional view of a flow rate control valve employed in the conventional antiskid apparatus;

FIG. 2 is a longitudinal sectional view showing the general arrangement of the conventional antiskid apparatus; and FIG. 3 is a sectional view taken along the line III—III of FIG. 2.

FIGS. 4, 5 and 6 show in combination one embodiment of the antiskid apparatus according to the present invention, in which:

FIG. 4 is a longitudinal sectional view of a flow rate control valve employed in the embodiment;

FIG. 5 is a sectional view taken along the line V—V of Fig.4; and

FIG. 6 is a longitudinal sectional view of the flow rate control valve in a state wherein the seat portion provided therein is closed.

DESCRIPTION OF THE PREFERRED EMBODIMENT

Figure 1:
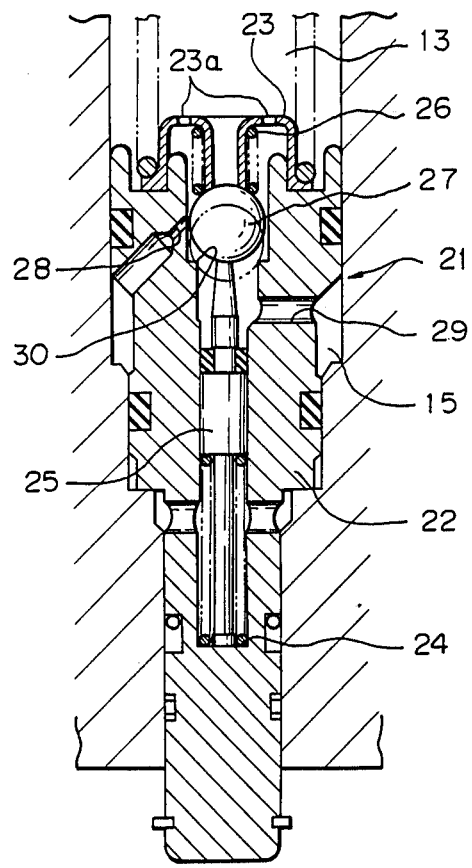

One embodiment of the antiskid apparatus according to the present invention will be described hereinunder with reference to FIGS. 4 to 6. In these figures, members or portions which correspond to those in the above-described prior art are denoted by the same reference numerals, and description thereof is omitted.

The antiskid apparatus of the present invention has a lock detecting section, a liquid pressure regulating section and a pressure raising section in the same way as the abovedescribed prior art, but it differs from the prior art in the structure of the flow rate control valve 31 which is provided in the discharge passage 15 that extends from the liquid pressure regulating or cylinder chamber 13 in the liquid pressure regulating section to the reservoir of the master cylinder for the purpose of controlling the flow rate of discharged braking liquid upstream of the damp valve. Since the arrangement of the other portions of this embodiment is the same as that of the prior art, description thereof is omitted.

The flow rate control valve 31 has a valve body 32 which is provided below the cylinder liquid pressure regulating or chamber 13 in the liquid pressure regulating section in such a manner that the valve body 32 defines the bottom wall of the cylinder chamber 13. A piston-shaped valve member 33 is vertically movably received in the valve body 32. The lower portion of the valve member 33 is slidably received in the valve body 32 in such a manner that said lower portion is in close contact with the inner peripheral surface of the valve body 32, while the upper portion of the valve member 33 has an outer diameter which is such that a clearance is provided between said upper portion and the inner peripheral surface of the valve body 32, and a valve chamber 34 is defined between the upper and lower portions of the valve member 33. The valve chest 34 is communicated with the discharge passage 15 through a through-hole 35 provided in the side portion of the valve body 32 and is further communicated with the cylinder chamber 13 through an inlet port 36 defined by the upper end portion of the valve body 32 which is formed such as to have an enlarged inner diameter.

Figure 2:
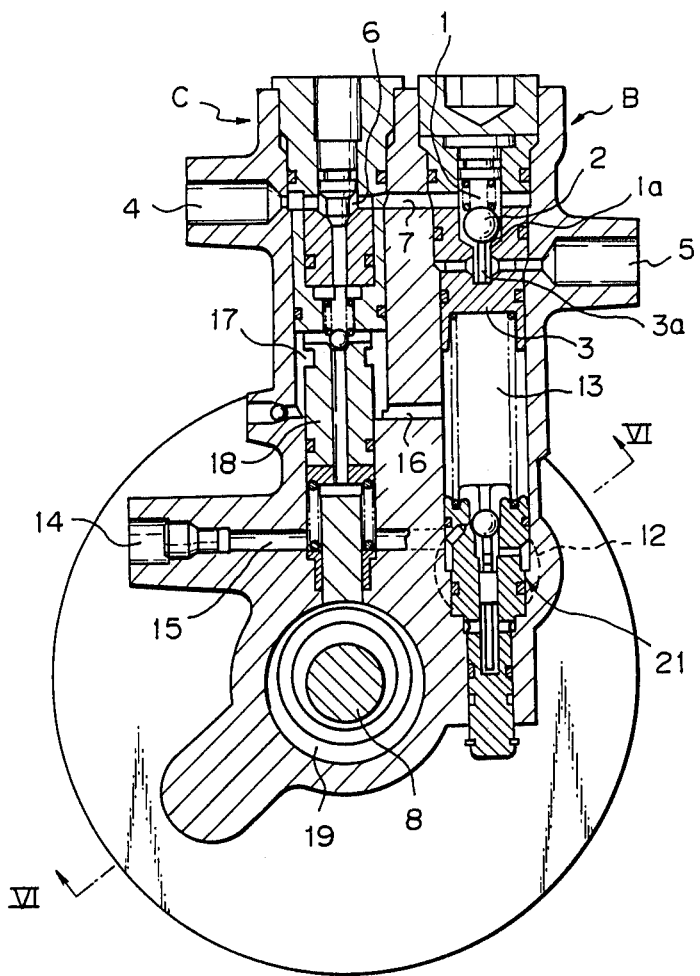
Figure 3:
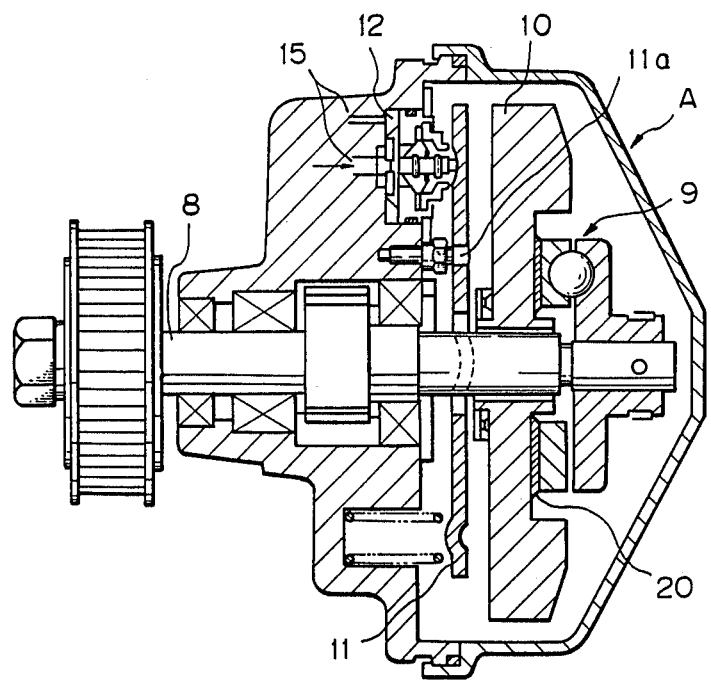
Figure 4:
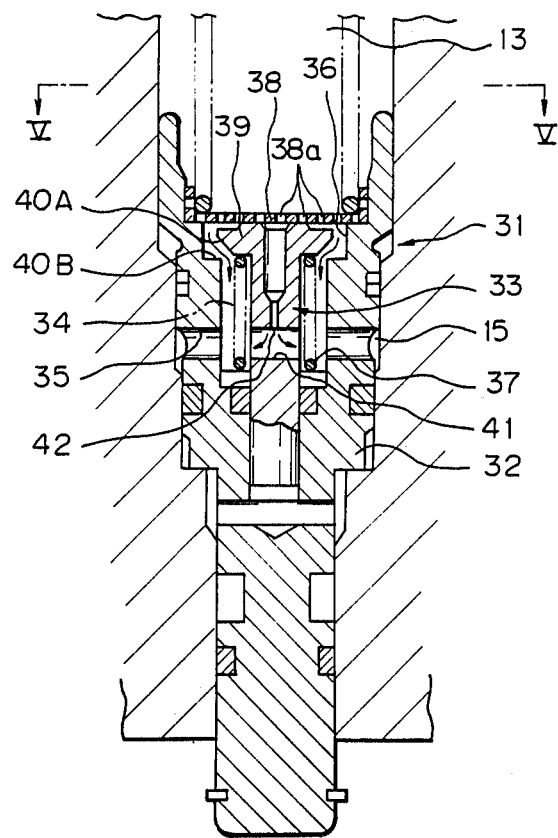
Figure 5:
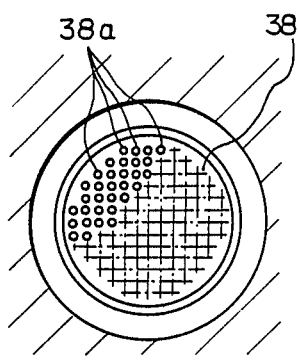
Figure 6:
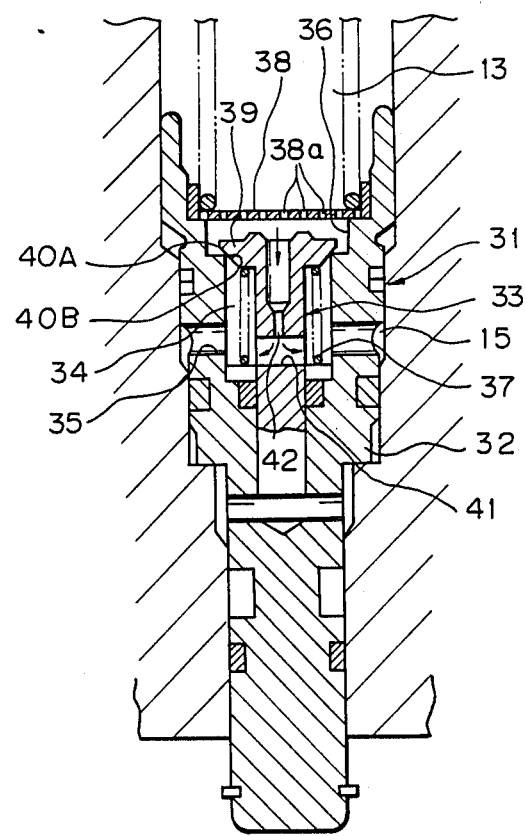

A spring 37 is provided between the valve member 33 and the valve body 32 in such a manner that the spring 37 extends vertically as viewed in FIGS. 4 and 6. The spring 37 biases the valve member 33 upwardly, that is, toward the cylinder chamber 13. A retainer 38 is provided at the upper end of the valve body 33 in such a manner that the retainer 38 covers the inlet port 36, the retainer 38 defining the upper-limit position of the valve member 33. The retainer 38 is formed in the shape of a plate which extends across the inlet port 36, and has a multiplicity of bores 38a disposed in a mesh-like configuration as shown in FIG. 2. Thus, the cylinder chamber 13 and the inlet port 36 are communicated with each other through these bores 38a.

A conical enlarged-diameter portion 39 is provided integrally with the upper end portion of the valve member 33, said portion 39 having a slight clearance between the same and the inner peripheral surface of the inlet port 36. Thus, seat portions 40A and 40B for selectively opening and closing the valve chamber 34 are defined by the conical surface of the enlarged-diameter portion 39 and the stepped portion of the valve body 32. A through-hole 41 is provided in the central portion of the valve member 33 in such a manner that the through-hole 41 extends diametrically such as to open into the valve chest 34. The through-hole 41 communicates with an orifice 42 which is provided in the valve member 33 in such a manner that its upper end has an opening at the upper end of the valve member 33. More specifically, the cylinder chamber 13 and the valve chamber 34 can be communicated with each other through two flow paths, that is, a first flow path which extends through the area between the seat portions 40A and 40B and a second flow path which extends through the orifice 42 and the through-hole 41.

The following is a description of the operation of the antiskid apparatus having the flow rate control valve 31 arranged as detailed above.

During a wheel locking operation, when the braking liquid in the cylinder chamber 13 is returned to the reservoir of the master cylinder with the damp valve opened, the flow rate of discharged braking liquid is controlled in accordance with the liquid pressure within the cylinder chamber 13 as follows.

When the vehicle is running on a road surface that exhibits a relatively high coefficient of friction, such as a concrete surface, the braking liquid pressure at the time the wheel approaches a locked state is relatively high. Therefore, a relatively high pressure acts within the cylinder chamber 13 in the liquid pressure regulating section, so that the valve member 33 of the flow rate control valve 31 is caused by this liquid pressure to descend against the force of the spring 37, thus closing the seat portions 40A and 40B as shown in FIG. 6. Accordingly, the braking liquid within the cylinder chamber 13 is led into the valve chamber 34 through the orifice 42 in the valve member 33 alone as shown by the arrows in FIG. 6, and the liquid is then led to the discharge passage 15 through the through-hole 35 and returned to the reservoir. On the other hand, when the vehicle is running on a road surface that displays a relatively low coefficient of friction, such as an icy surface, the pressure of the braking liquid at the time the wheel approaches a locked state is relatively low. Therefore, the pressure within the cylinder chamber 13 is relatively low, and the valve member 33 of the flow rate control valve 31 is thus brought into contact with the retainer 38 by means of the biasing force from the spring 37 as shown in FIG. 4, that is, the seat portions 40A and 40B are opened. Accordingly, the braking liquid within the cylinder chamber 13 is led to the valve chamber 34 in such a manner that a part of the braking liquid passes through the orifice 42 in the valve body 33 and the greater part of the liquid passes through the area between the seat portions 40A and 40B as shown by the arrows in FIG. 4, and the braking liquid is then returned to the reservoir at a relatively high flow rate.

Thus, when the vehicle is running on a road surface that exhibits a relatively high coefficient of friction, the braking liquid is discharged at a relatively low flow rate through the orifice 42 in the valve member 33 alone, thereby enabling a lowering in the rate of pressure reduction, whereas, when the vehicle is running on a road surface that displays a relatively low coefficient of friction, the braking liquid is discharged through both the area between the seat portions 40A, 40B and the orifice 42 at a relatively high flow rate, thereby enabling a rise in the rate of pressure reduction. Thus, it is possible to effect optimal control in accordance with the friction coefficient of the road surface in question. Since the valve member 33 alone is moved vertically during this control, the response of the valve member 33 is less affected by other components, so that smooth movement of the valve member 33 is ensured. In addition, since the weight of the valve member 33 is reduced by virtue of the existence of the orifice 42, the response of the valve member 33 is further improved, so that it is possible to effect control reliably and effectively. Since one of the two flow paths for effecting the flow rate control is defined between the seat portions 40A and 40B which are respectively provided on the valve member 33 and the valve body 32, a slight movement of the valve member 33 enables the seat portions 40A and 40B to be opened reliably and widely, so that it is possible to rapidly reduce the liquid pressure.

Since the retainer 38 is provided with a multiplicity of bores 38a in a mesh-like configuration, the fluid resistance thereof is lowered and therefore the effect of the retainer 38 on the flow of the braking liquid can be reduced. In addition, if foreign matter should enter the cylinder chamber 13, it is effectively prevented by the retainer 38 from entering the flow rate control valve 31, so that it is possible to prevent the incidence of such problems as clogging of the orifice 42. In addition, since the majority of the multiplicity of bores 38a can be maintained in an open state, it is possible to ensure reliable discharge of the braking liquid.

It should be noted that, although in this embodiment the seat portion 40A of the valve member 33 is defined by a conical surface, it may be defined by a spherical surface or other similar surfaces, and the configurations of particular members such as the valve body 32 are not necessarily limitative to those mentioned in this embodiment.

As will be clear from the above description, the antiskid apparatus according to the present invention provides the following advantages:

(i) Since the valve member is the only movable component of the flow rate control valve, it is able to move smoothly. Further, provision of an orifice in the valve member enables a reduction in its weight and hence permits an improvement in the response of the valve. Since one of the two flow paths is defined between two seat portions, a slight movement of the valve member enables the seat portions to be opened reliably and widely, so that a rapid reduction in pressure can be effected. Thus, the control function which is essential to the valve is improved.

(ii) The antiskid apparatus can be arranged using a relatively small number of components such as a valve body, a valve member and a spring, so that production of the apparatus is facilitated and the production cost can be reduced as compared with the prior art.

(iii) The retainer is formed in the shape of a plate in which are provided a multiplicity of bores in a mesh-like configuration, so that the fluid resistance of the retainer is lowered and this enables a reduction in the adverse effect on the flow of the braking liquid. In addition, the intrusion of foreign matter is effectively prevented to thereby avoid failure.

Although the present invention has been described through specific terms, it should be noted here that the described embodiment is not necessarily limitative and various changes and modifications may be imparted thereto without departing from the scope of the invention which is limited solely by the appended claims.

What is claimed is:

1. An antiskid apparatus for being provided in a communicating passage extending between a master cylinder and a brake cylinder in a brake system for a vehicle, said apparatus comprising:

a pressure regulating section having a liquid pressure regulating chamber and means for cutting off the communication between the master cylinder and the brake cylinder and for reducing the pressure of a brake fluid within the brake cylinder for discharging the brake fluid from said liquid pressure regulating chamber through a damping valve;

a lock detection section for opening and closing said damping valve when detecting a locked and unlocked state of a wheel, respectively;

pressure raising means for re-raising the fluid pressure within said liquid pressure regulating chamber by supplying the brake fluid to said liquid pressure regulating chamber the pressure of which has been reduced;

a discharge passage communicating said liquid pressure regulating chamber and said damping valve;

a flow rate control valve provided in said discharge passage, said flow rate control valve including a valve body defining a first flow path defining a part of said discharge passage, and a valve member reciprocatingly disposed in said flow rate control valve along the first flow path, said valve member having an enlarged portion, said enlarged portion having a first valve seat portion, said valve body having a second valve seat portion for mating with said first valve seat portion for closing off the first flow path along which said valve member is reciprocatingly disposed, said flow rate control valve having means for biasing said valve member for keeping said first and second valve seat portions normally apart for keeping open the first flow path along which said valve member is reciprocatingly disposed, the pressure of brake fluid within said liquid pressure regulating chamber exerting force on said valve member for mating said first and second valve seat portions for closing off the first flow path when the force exerted by the brake fluid in said liquid pressure regulating chamber exceeds the force of said biasing means; and said valve member having an internal orifice therein defining a second flow path in parallel to the first flow path and communicating said liquid pressure regulating chamber and said damping valve.

2. An antiskid apparatus according to claim 1, wherein said valve member is piston-shaped.

3. An antiskid apparatus according to claim 1, wherein said enlarged portion is substantially conical.

4. An antiskid apparatus according to claim 1, wherein said flow rate control valve further includes a retainer for retaining said valve member against the biasing force from said biasing means.

5. An antiskid apparatus according to claim 4, wherein said retainer is plate-like, extends across said first and second flow paths, and has a multiplicity of small bores communicating said liquid pressure regulating chamber with the first and second flow paths.

* * * * *

UNITED STATES PATENT AND TRADEMARK OFFICE
CERTIFICATE OF CORRECTION

PATENT NO. : 4,779,934

DATED : October 25, 1988

INVENTOR(S) : Hiromi ANDO

It is certified that error appears in the above—identified patent and that said Letters Patent is hereby corrected as shown below:

Column 8, line 1 (Claim 1, line 9), after "cylinder" change "for" to --by--;

Column 8, line 30 (Claim 1, line 38), after "disposed," insert --and--.

Signed and Sealed this

Twenty-third Day of May, 1989

Attest:

DONALD J. QUIGG

*Attesting Officer*   Commissioner of Patents and Trademarks